United States Patent
Hanazaki et al.

(10) Patent No.: US 6,768,308 B2
(45) Date of Patent: Jul. 27, 2004

(54) FLAME-CUT DETECTING DEVICE FOR INTERNAL COMBUSTION ENGINE

(75) Inventors: Ryoichi Hanazaki, Tokyo (JP); Koji Nishimoto, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 92 days.

(21) Appl. No.: 10/120,582

(22) Filed: Apr. 12, 2002

(65) Prior Publication Data

US 2003/0080745 A1 May 1, 2003

(30) Foreign Application Priority Data

Oct. 30, 2001 (JP) .................................. P 2001-332254

(51) Int. Cl.[7] .............................. F02P 17/00; G01L 3/26

(52) U.S. Cl. ...................................... 324/378; 73/117.3
(58) Field of Search .......................... 324/378; 73/117.3

(56) References Cited

U.S. PATENT DOCUMENTS 6,298,717 B1 * 10/2001 Nishimura ................. 73/117.3

* cited by examiner

*Primary Examiner*—N. Le
*Assistant Examiner*—Donald M Lair
(74) *Attorney, Agent, or Firm*—Sughrue Mion, PLLC (57) ABSTRACT

When operating area detecting device detects an operating area that has a predetermined rotation number of below, flame-cut determination selecting circuitry determines the flame-cut on the basis of the logical product between a detection result of first flame-cut detecting device and a detection result of second flame-cut detecting circuitry.

4 Claims, 6 Drawing Sheets

|  |  | FLAME-CUT DETECTION ON THE BASIS OF ION CURRENT | |
|---|---|---|---|
|  |  | NORMAL DETERMINATION | FLAME-CUT DETERMINATION |
| FLAME-CUT DETECTION ON THE BASIS OF THE ROTATION INFORMATION | NORMAL DETERMINATION | NORMAL | NORMAL |
|  | FLAME-CUT DETERMINATION | NORMAL | FLAME-CUT |

*FIG. 6*

FLAME-CUT DETECTING DEVICE FOR INTERNAL COMBUSTION ENGINE

BACKGROUND OF THE INVENTION

The present invention relates to a misfire detecting device for an internal combustion engine, and more particularly to a misfire detecting device for an internal combustion engine having enhanced reliability in the entire operating area by detecting a misfire on the basis of the rotation information or an ion current in an operating area.

Conventionally, the misfire detecting device for the internal combustion engine employing a variation in pulse period ratio as the rotation information was well known. Further, the misfire detecting device for the internal combustion engine employing a detection level of the ion current was also well known.

Generally, it is well known that the reliability (S/N ratio) of misfire detection based on the rotation information and the ion current changes in accordance with the operating area (rotation number) of the internal combustion engine, and the reliability of misfire determination based on the period ratio (rotation information) is degraded with an increased rotation number of the engine. Also, the reliability of misfire determination based on the ion current is degraded with a decreased rotation number of the engine.

Thus, in order to solve the above-mentioned problems, a technique has been proposed in which the reliability of misfire determination in the entire operating area is improved by detecting a misfire on the basis of the rotation information in a low rotation area and detecting the misfire on the basis of the ion current in a high rotation area, as disclosed in the Unexamined Japanese Patent Application Publication No. 2000-240550.

However, in a multiple cylinder engine (e.g., 8 or greater cylinder engine), the reliability of misfire determination in the low rotation area may be degraded even on the basis of the rotation information. In the conventional misfire detecting device for the internal combustion engine as above mentioned, the misfire detection is only based on the rotation information in the low rotation area, resulting in a problem that the reliability of misfire determination is degraded to lead to a false determination of misfire during the normal combustion.

SUMMARY OF THE INVENTION

This invention is achieved to solve the above-mentioned problem, and it is an object of the invention to provide a misfire detecting device for the internal combustion engine in which the reliability of misfire determination in the low rotation area is improved.

According to a first aspect of the present invention, there is provided a misfire detecting device for an internal combustion engine comprising various kinds of sensors for sensing an operating condition of the internal combustion engine, operating area detecting means for detecting the operating area of the internal combustion engine from the operating condition, control parameter calculating means for calculating a control parameter of the internal combustion engine, on the basis of the operating condition, an igniter for igniting the internal combustion engine in accordance with the control parameter, an ion current detector for detecting an ion current produced by ignition of the internal combustion engine, first misfire determination means for determining a misfire of the internal combustion engine on the basis of a temporal change of the rotation information of the internal combustion engine contained in the operating condition, second misfire determination means for determining a misfire of the internal combustion engine on the basis of the ion current, and misfire determination selecting means for selectively employing the first or second misfire determination means in accordance with the operating area, characterized in that when the operating area detecting means detects the operating area that is less than or equal to a predetermined rotation number, the misfire determination selecting means determines the misfire in accordance with the logical product between a detection result of the first misfire detecting means and a detection result of the second misfire detecting means.

Also, according to a second aspect of the invention, there is provided the misfire detecting device for the internal combustion engine, characterized in that the misfire determination selecting means comprises ion current state determining means for determining an adequate state of the ion current, wherein when it is determined that the ion current is adequate, means for determining the misfire in accordance with the logical product between a detection result of the first misfire detecting means and a detection result of the second misfire detecting means is employed in an area of a predetermined rotation number or less, while when it is determined that the ion current is inadequate, the first misfire detecting means is employed in the area of the predetermined rotation number or less.

DETAILED DESCRIPTION OF THE PREFERRED EMBODIMENTS (Embodiment 1)

Figure 1:
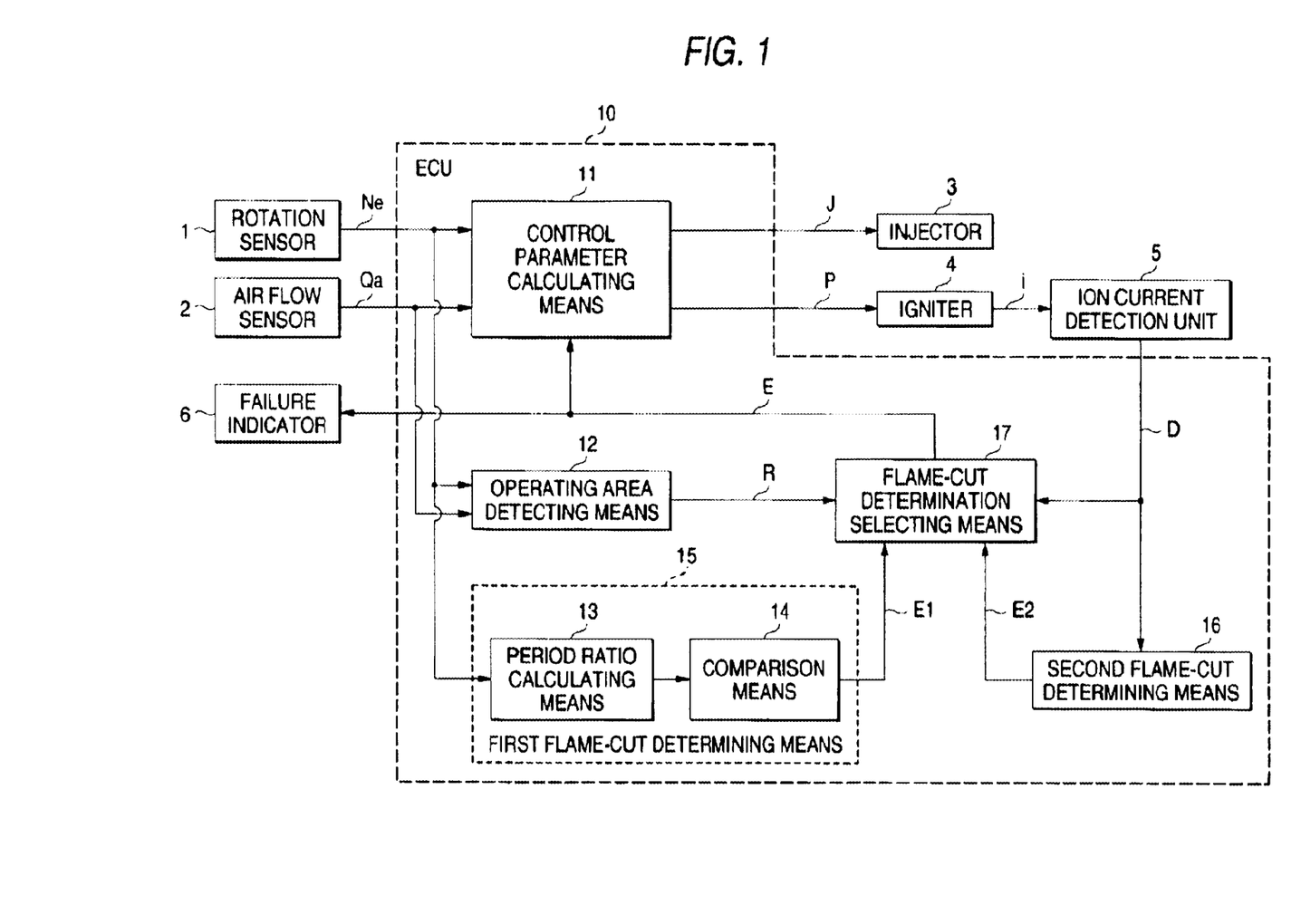
FIG. 1 is a block diagram showing a misfire detecting device for an internal combustion engine according to an embodiment 1 of the present invention.
Figure 2:
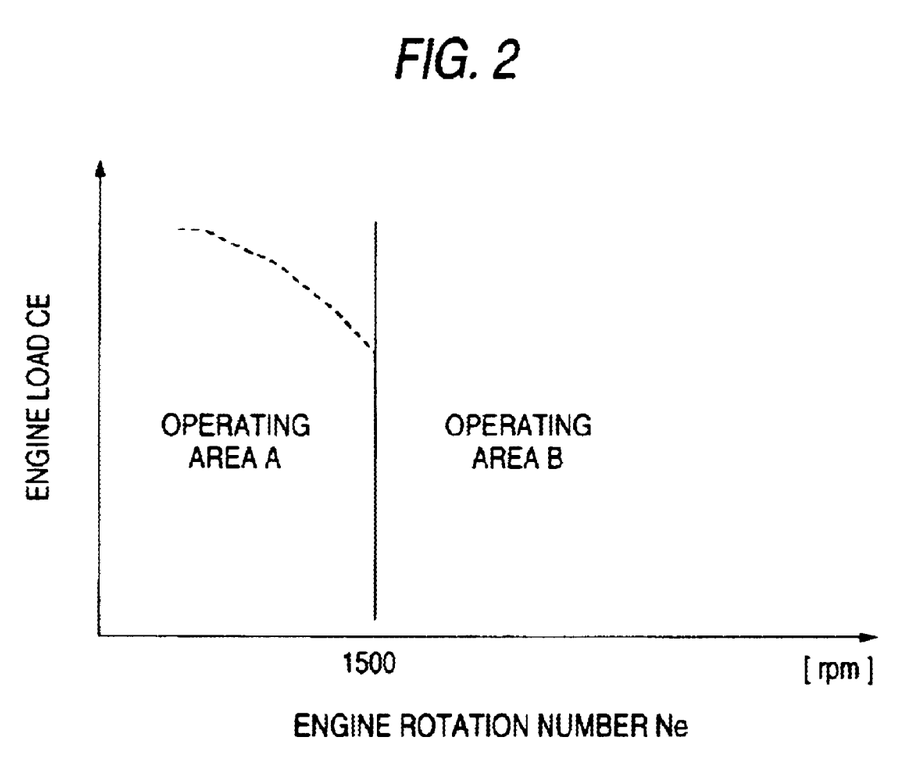
FIG. 2 is a graphical representation for explaining an operating area for the misfire detecting device for the internal combustion engine according to the embodiment 1 of the invention.
Figure 3:
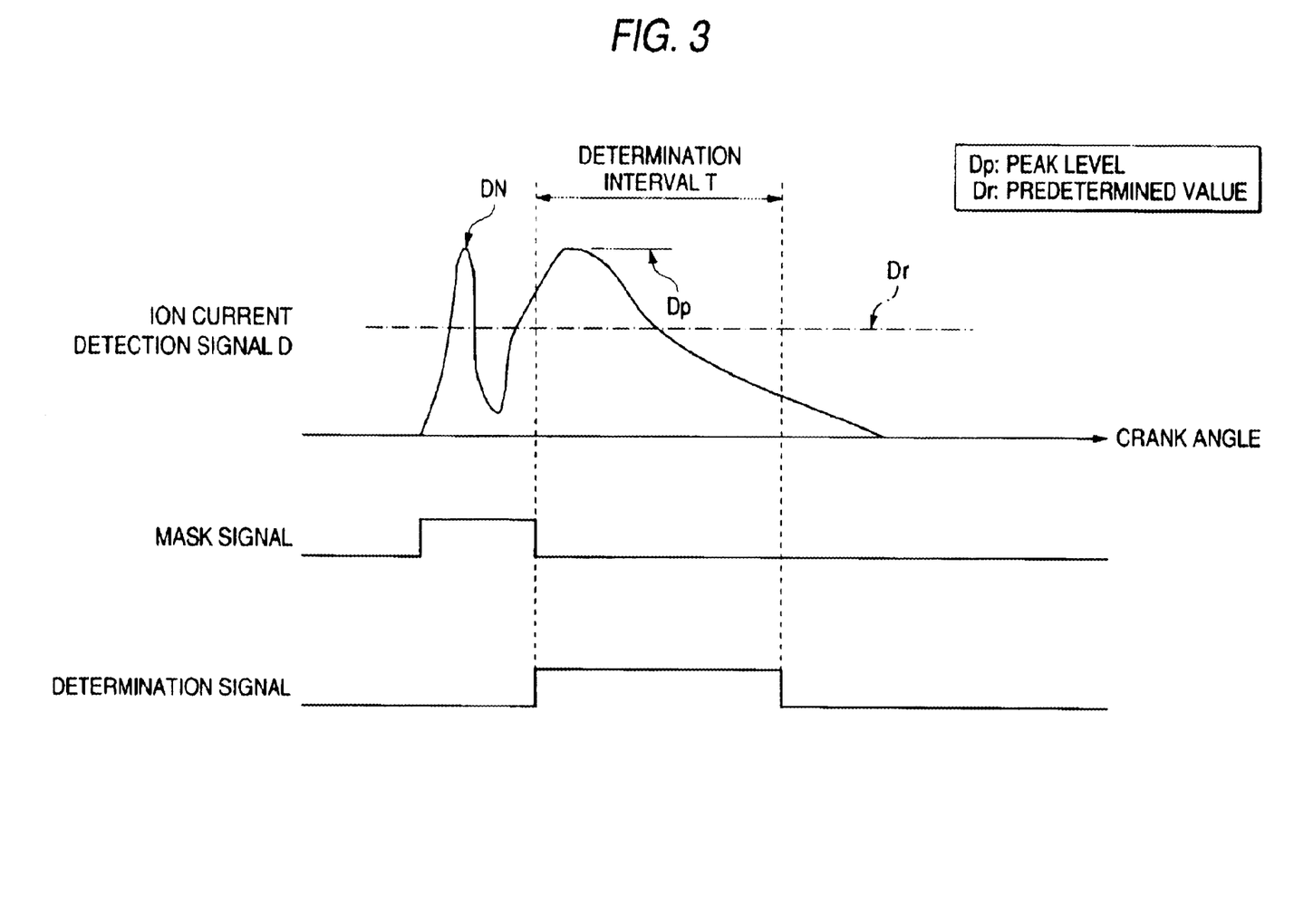
FIG. 3 is a waveform diagram showing an operation of determining the ion current state in the misfire detecting device for the internal combustion engine according to the embodiment 1 of the invention.

FIG. 1 is a block diagram showing a misfire detecting device for an internal combustion engine according to an embodiment 1 of the invention. FIG. 2 is a graphical representation for explaining an operating area detected by operating area detecting means as shown in FIG. 1. And FIG. 3 is a waveform diagram showing the operation of ion current state determining means contained in misfire determination selecting means as shown in FIG. 1.

In FIG. 1, an engine (not shown) is provided with a rotation sensor 1 and an air flow sensor 2 as a variety of kinds of sensors to sense the operating condition, an injector 3 for injecting a fuel as an actuator for driving the engine, and an igniter 4 for controlling the ignition.

Herein, as a variety of kinds of sensors, the rotation sensor 1 and the air flow sensor 2 are only shown, but practically, a throttle aperture sensor and a coolant temperature sensor may be provided as other kinds of sensors, not shown. Also, as the actuator for driving the engine, the injector 3 and the igniter 4 are shown, are practically an ISC valve actuator may be provided in a bypass line of a suction pipe as other actuators, not shown.

The rotation sensor 1 outputs a pulse signal corresponding to the engine rotation number Ne (rotation information). This pulse signal has an edge corresponding to each reference crank angle of a multiple engine cylinder, and each reference crank angle is employed to calculate the control timing of the engine. The air flow sensor 2 outputs a voltage signal corresponding to a suction amount Qa of the engine. Also, the igniter 4 is provided with an ion current detection unit 5 for detecting an ion current i produced at the time of ignition to output an ion current detection signal D.

An ECU (Electronic Control Unit) 10 consisting of a microcomputer takes in a sensor signal indicating the engine rotation number Ne and the suction amount Qa and an ion current detection signal D, for example, as the operating condition of the engine, to make the misfire determination (hereinafter described), and as a result, outputs a misfire determination signal E to a failure indicator 6. Also, the ECU 10 outputs a fuel injection signal J to the injector 3 and an ignition signal P to the igniter 4.

The ECU 10 comprises control parameter calculating means 11 and operating area detecting means 12 into which the engine rotation number Ne and the suction amount Qa are entered, first misfire determining means 15 composed of period ratio calculating means 13 and comparison means 14, into which the engine rotation number Ne is entered, second misfire determining means 16 into which the ion current detection signal D is entered, and misfire determination selecting means 17 into which the determination results of the first and second misfire determining means 15 and 16 are entered.

The control parameter calculating means 11 calculates the control parameters (a fuel injection signal J and an ignition signal P) of the engine, on the basis of the operating condition (engine rotation number Ne and suction amount Qa). The fuel injection signal J and the ignition signal P are output as the drive signals for the injector 3 and the igniter 4, respectively.

The operating area detecting means 12 detects a plurality of operating areas A and B divided as shown in FIG. 2 from the engine rotation number Ne, and outputs an operating area detection signal R indicating each of the operating areas A and B.

In FIG. 2, the engine rotation number Ne (rpm) is represented along the transverse axis, and the engine load CE is represented along the longitudinal axis. The operating area A denotes a low rotation area with a rotation number of 1500 rpm or less corresponding to an idle rotation number, and the operating area B denotes a high rotation area with a rotation number of over 1500 rpm. Each of the operating areas A and B maybe variably set in accordance with the engine load CE (suction amount Qa) as indicated by the broken line in FIG. 2.

The period ratio calculating means within the first misfire determining means 15 calculates the preceding and succeeding period ratios by measuring successively the period of edge (reference crank angle) of a pulse signal indicating the engine rotation number Ne, and stores successively the temporal change of the period ratio. Also, the comparison means 14 within the first misfire determining means 15 compares a change in the period ratio with a predetermined value, and outputs a first misfire determination signal E1 if a rapid decrease in the engine rotation number Ne (misfire) is determined.

The second misfire determining means 16 determines the combustion condition at the time of ignition from a peak level of the ion current detection signal D or an integral value of the ion current detection signal D during a predetermined interval after ignition, for example, and determines the misfire of the engine to output a second misfire determination signal E2 if the peak level of the ion current detection signal D or the integral value is less than or equal to a reference value.

The misfire determination selecting means 17 employs selectively the first or second misfire determining means 15 or 16 in accordance with the operating area detection signal R to output the first misfire determination signal E1 or the second misfire determination signal E2, or the logical product between the first misfire determination signal E1 and the second misfire determination signal E2, as a final misfire determination signal E, to the control parameter calculating means 11 and the failure indicator 6.

Thereby, the control parameter calculating means 11 prevents aggravation of the exhaust gas and the damage on the engine by correcting the output timing of the fuel injection signal J and the ignition signal P in response to a misfire determination signal E. Also, the failure indicator 6 displays the presence or absence of a failure due to misfire in response to a misfire determination signal E.

Figure 5:
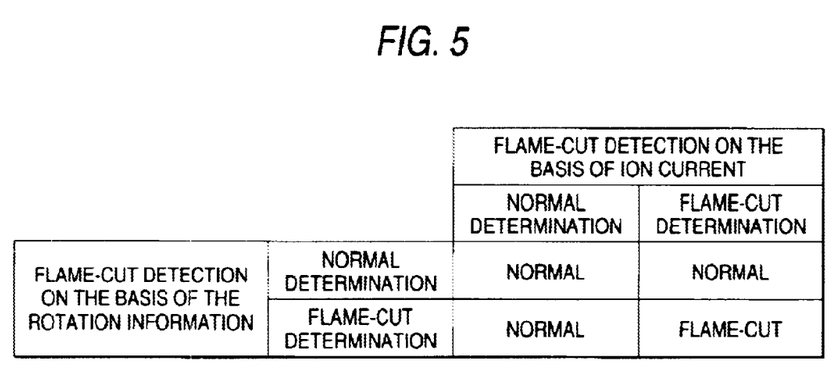
FIG. 5 is an explanatory table for explaining means for determining the misfire in accordance with the logical product between the determination result of the rotation information and the determination result of the ion current in the misfire detecting device for the internal combustion engine according to the embodiment 1 of the invention.

The misfire determination selecting means 17 uses the first misfire determining means 15 based on the engine rotation number Ne and the second misfire determining means 16 based on the ion current to output the logical product of these misfire determination signals as a final misfire determination signal E, if the operating area detection signal R indicates the operating area A flow rotation area), as shown in FIG. 5.

Also, the misfire determination selecting means 17 uses the second misfire determining means 16 based on the ion current that is reliable in the high rotation side to output the second misfire determination signal E2 as a final misfire determination signal E, if the operating area detection signal R indicates the operating area B (high rotation area).

Moreover, the misfire determination selecting means 17 comprises ion current state determining means (not shown) for determining the adequate state of ion current i, and disables the second misfire determining means 16 in the operating area B and enables the first misfire determining means 15 alone, if it is determined that the ion current i is inadequate.

The ion current state determining means within the misfire determination selecting means 17 determines the inadequate state of the ion current i, and sets a flag F (F=1) indicating that the ion current is inadequate, if the peak level Dp of the ion current detection signal D is less than or equal to a predetermined value Dr, as shown in FIG. 3, for example.

At this time, the inadequate state of ion current i can be determined relatively simply only by comparing the peak level Dp with a predetermined value Dr. Also the predetermined value Dr is set to a value greater than the reference value for determining the misfire.

In FIG. 3, since the noise DN at the time of ignition is superposed on the ion current detection signal D, the ion current state determining means masks an interval immediately after ignition with a mask signal and detects the ion current detection signal D with a determination signal after completion of the mask signal to have a determination interval T to prevent the false detection or ignition noise DN.

Figure 4:
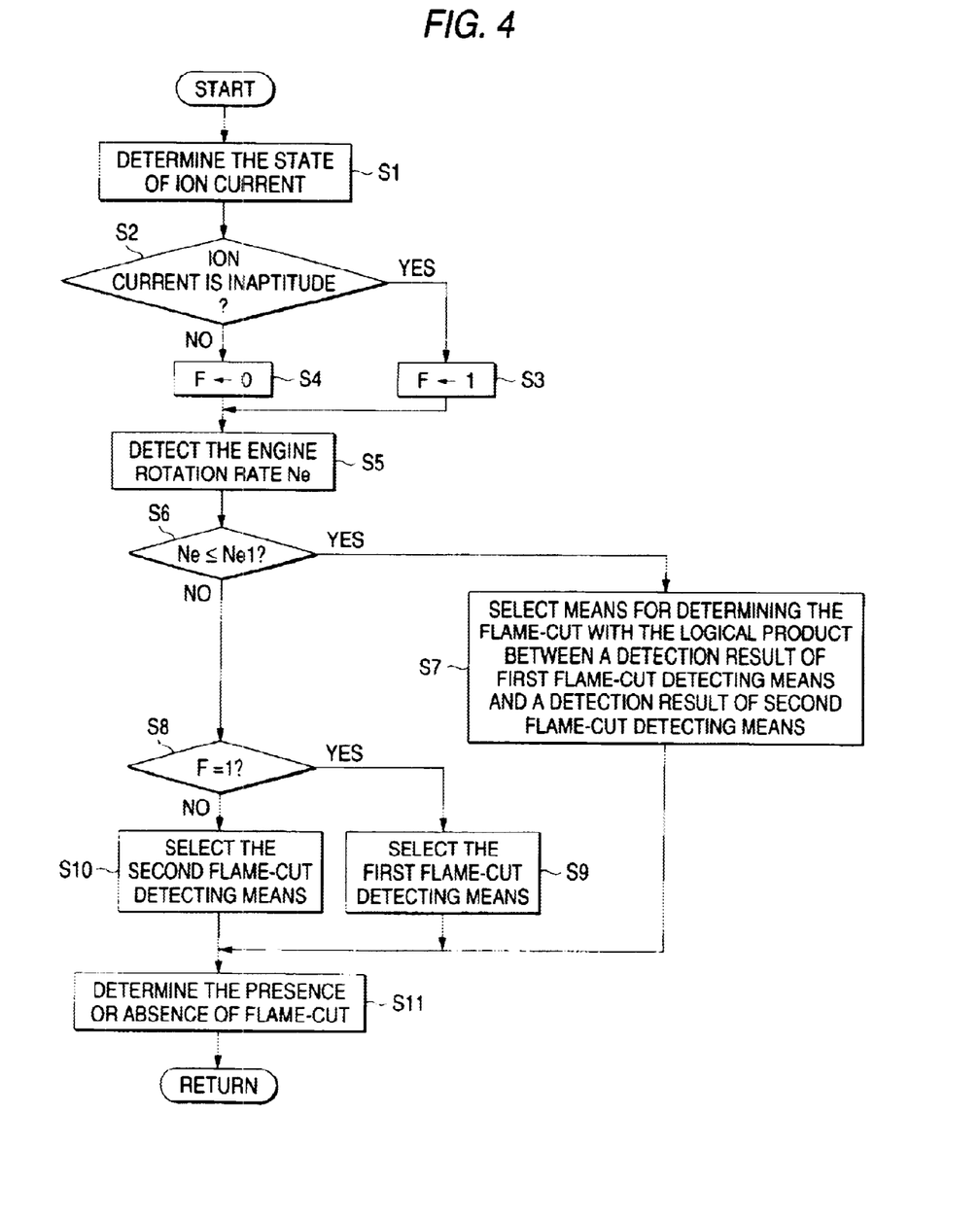
FIG. 4 is a flowchart showing the processing operation of the misfire detecting device for the internal combustion engine according to the embodiment 1 of the invention.

The operation will be now described. FIG. 4 is a flowchart showing the operation of the misfire detecting device for the internal combustion engine according to the embodiment 1 of this invention, namely, the processing operation for the operating area detecting means 12 and the misfire determination selecting means 17 within the ECU 10.

First of all, the ion current state determining means within the misfire determination selecting means 17 determines the state of ion current i (step S1). That is, whether or not the ion current i is adequate is determined depending on whether or not the peak level Dp of the ion current detection signal D is less than or equal to the predetermined value Dr (step S2).

If it is determined that Dp is less than or equal to Dr (i.e., YES), the ion current i is in inadequate state, the flag F is set to "1" (step S3), and the procedure goes to step S5.

Also, if it is determined that Dp is greater than Dr (i.e., NO) at step S2, the ion current i is in adequate state, whereby the flag F is cleared to "0" (step S4), and the procedure goes to step S5.

The operating area detecting means 12 detects the engine rotation number Ne on the basis of an output signal of the rotation sensor 1 (step S5), and it is determined whether or not the engine rotation number Ne is less than or equal to a predetermined rotation number Ne1 (e.g., 1500 rpm) (operating area A) (step S6).

If it is determined that Ne is less than or equal to Ne1 (i.e., YES), the operating area detecting means 12 outputs an operating area detection signal R indicating the operating area A. In response to that, the misfire determination selecting means 17 selects means for determining the misfire, using the logical product between the first misfire determination signal E1 and the second misfire determination signal E2 (step S7), and determines the presence or absence of misfire, using the logical product between the first misfire determination signal E1 and the second misfire determination signal E2 (step S11). After the end of the processing of FIG. 4, the procedure returns.

If it is determined that Ne is greater than Ne1 (i.e., NO) at step S6, the operating area detecting means 12 outputs an operating area detection signal R indicating the operating area B. In response to that, the misfire determination selecting means 17 determines whether or not the flag F indicating the inadequate of ion current is "1" (step S8).

If it is determined that the flag F is equal to 0 (i.e., NO), the second misfire determining means 16 is selected (step S10) because the ion current i is in adequate state, and then the presence or absence of misfire is determined using the second misfire determination signal E2 (step S11). After the end of processing of FIG. 4, the procedure returns.

If it is determined that the flag F is equal to 1 (i.e., YES) at step S8, the misfire determination selecting means 17 disables the selected second misfire determining means 16, and selects the first misfire determining means 15 (step S9), and then the presence or absence of misfire is determined employing the first misfire determination signal E1 (step S11). After the end of processing of FIG. 4, the procedure returns.

As described above, with the embodiment 1 of the invention, the misfire determination selecting means 17 employs means for determining the misfire in accordance with the logical product between the detection result of the first misfire determining means 15 based on the rotation information and the detection result of the second misfire determining means 16 based on the ion current in the operating area A. That is, in an area of a predetermined rotation number or less, the misfire is determined only if both the detection result of the rotation information and the detection result of the ion current indicate the misfire. Also, in the operating area B, the second misfire determining means 16 is employed if the ion current state is adequate, or the first misfire determining means 15 is employed if it is inadequate.

Thereby, the misfire can be detected with high reliability in all the operating areas A and B. In particular, the reliability of misfire determination in the low rotation area can be improved. Also, even if the waveform and level of the ion current detection signal D is changed due to a difference in the fuel properties so that the ion current i is in inadequate state, a false detection of misfire can be prevented by disabling the second misfire determining means 16 in the operating area B and changing to the first misfire determining means 15.

(Embodiment 2)

Figure 6:
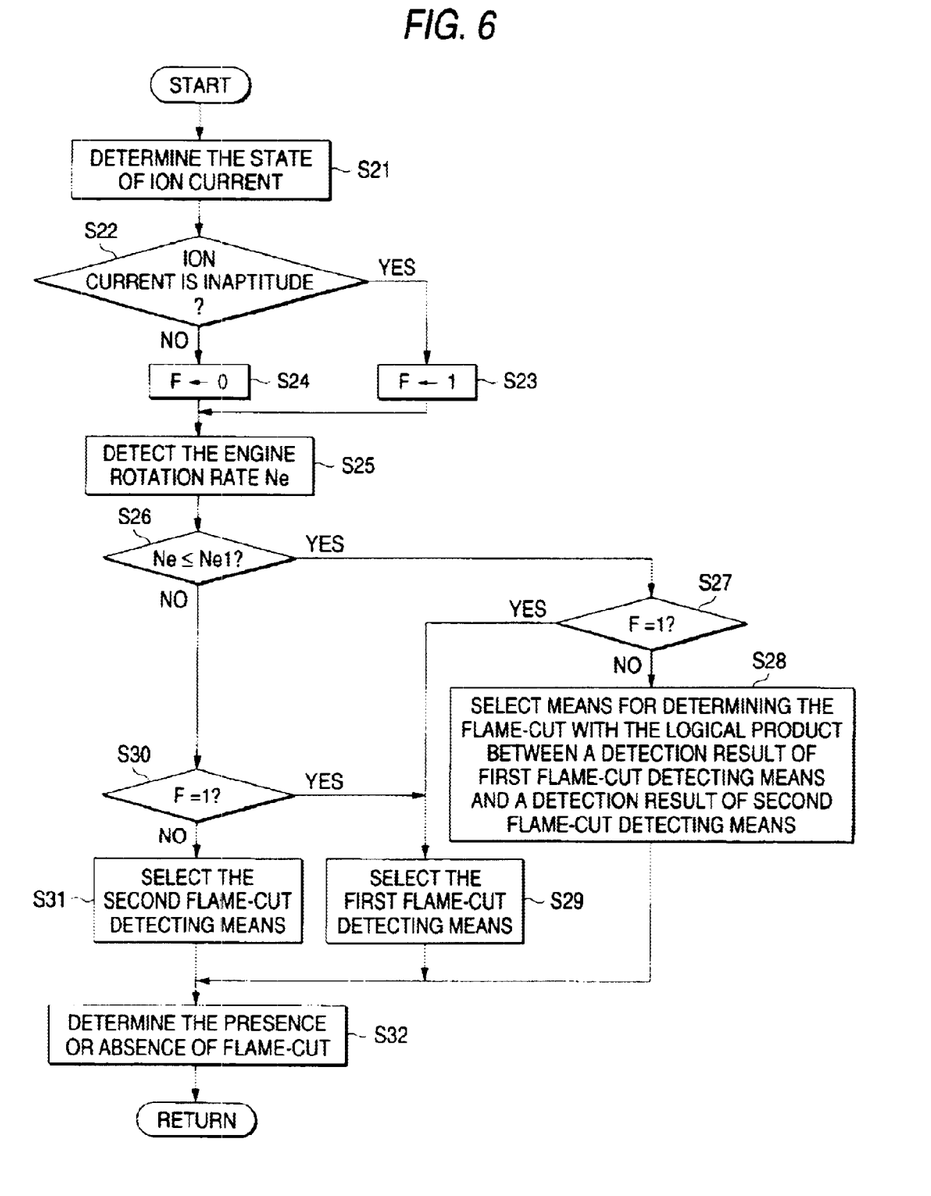
FIG. 6 is a flowchart showing the processing operation of a misfire detecting device for an internal combustion engine according to an embodiment 2 of the invention.

FIG. 6 is a flowchart showing the operation of the misfire detecting device for the internal combustion engine according to an embodiment 2 of this invention. In the same figure, step S21 in step S26 correspond to step S1 to step S6 in the operation flowchart of the embodiment 1, and the detailed explanation of step S21 to step S26 is omitted.

If it is determined that Ne is less than or equal to Ne1 (i.e., YES) at step S26, the operating area detecting means 12 outputs an operating area detection signal R indicating the operating area A. In response to that, the misfire determination selecting means 17 determines whether or not the flag F indicating the in adequate of ion current is "1" (step S27).

If it is determined that the flag F is equal to 0 (i.e., NO), the means for determining the misfire is selected using the logical product between the first misfire determination signal E1 and the second misfire determination signal E2 (step S28), and then the presence or absence of misfire is determined using the logical product between the first misfire determination signal E1 and the second misfire determination signal E2 (step S32). After the end of processing of FIG. 6, the procedure returns.

If it is determined that the flag F is equal to 1 (i.e., YES) at step S27, the misfire determination selecting means 17 disables the selected second misfire determining means 16, and selects the first misfire determining means 15 (step S29), and then the presence or absence of misfire is determined employing the first misfire determination signal E1 (step S32). After the end of processing of FIG. 6, the procedure returns.

If it is determined that Ne is greater than Ne1 (i.e., NO) at step S26, the operating area detecting means 12 outputs an operating area detection signal R indicating the operating area B. In response to that, the misfire determination selecting means 17 determines whether or not the flag F indicating the adequate of ion current is "1" (step S30).

If it is determined that the flag F is equal to 0 (i.e., NO), the second misfire determining means 16 is selected (step S31) because the ion current i is in adequate state, and then the presence or absence of misfire is determined using the second misfire determination signal E2 (step S32). After the end of processing of FIG. 6, the procedure returns.

If it is determined that the flag F is equal to 1 (i.e., YES) at step S30, the misfire determination selecting means 17 disables the selected second misfire determining means 16, and selects the first misfire determining means 15 (step S29), and then the presence or absence of misfire is determined employing the first misfire determination signal E1 (step S32). After the end of processing of FIG. 6, the procedure returns.

As described above, with the embodiment 2 of the invention, the misfire determination selecting means 17 employs means for determining the misfire in accordance with the logical product between the detection result of the first misfire determining means 15 based on the rotation information and the detection result of the second misfire determining means 16 base on the ion current, if the ion current state is adequate in the operating area A or the first misfire determining means 15 if it is inadequate.

That is, in the case where the ion current is determined to be adequate in an area of a predetermined rotation number or less by the ion current state determining means, the misfire is determined only if both the detection result of the rotation information and the detection result of the ion current indicate the misfire, or in the case where the ion current is determined to be inadequate, the misfire is determined with the detection result of the rotation information.

Thereby, even if the waveform and level of the ion current detection signal D is changed due to a difference in the fuel properties so that the ion current i is in inadequate state, a false detection of misfire can be prevented by disabling the second misfire determining means 16 in the operating area A and changing to the first misfire determining means 15. The control can be made at higher precision than in the embodiment 1.

As described above, according to the first aspect of the present invention, there is provided a misfire detecting device for an internal combustion engine comprising various kinds of sensors for sensing an operating condition of the internal combustion engine, operating area detecting means for detecting the operating area of the internal combustion engine from the operating condition, control parameter calculating means for calculating a control parameter of the internal combustion engine, on the basis of the operating condition, an igniter for igniting the internal combustion engine in accordance with the control parameter, an ion current detector for detecting an ion current produced by ignition of the internal combustion engine. First misfire determination means for determining a misfire of the internal combustion engine on the basis of a temporal change of the rotation information of the internal combustion engine contained in the operating condition, second misfire determination means for determining a misfire of the internal combustion engine on the basis of the ion current, and misfire determination selecting means for selectively employing the first or second misfire determination means in accordance with the operating area, characterized in that when the operating area detecting means detects the operating area that is less than or equal to a predetermined rotation number, the misfire determination selecting means determines the misfire in accordance with the logical product between a detection result of the first misfire detecting means and a detection result of the second misfire detecting means, whereby there is the effect that the misfire detecting device for internal combustion engine with improved reliability of determining the misfire in the low rotation area is provided.

Also, according to the second aspect of the invention, there is provided the misfire detecting device for the internal combustion engine, characterized in that the misfire determination selecting means comprises ion current state determining means for determining an adequate state of the ion current, wherein when it is determined that the ion current is adequate, means for determining the misfire in accordance with the logical product between a detection result of the first misfire detecting means and a detection result of the second misfire detecting means is employed in an area of a predetermined rotation number or less, while when it is determined that the ion current is inadequate, the first misfire detecting means is employed in the area of the predetermined rotation number or less, whereby there is the effect that the misfire detecting device for internal combustion engine is provided in which the reliability of determining the misfire in the low rotation area is improved and the false detection misfire is prevented even when the ion current is unstable.

What is claimed is:

1. A misfire detecting device for an internal combustion engine comprising:

sensors for sensing an operating condition of said internal combustion engine, operating area detecting means for detecting a divided operating area, on the basis of the rotation information of said internal combustion engine, control parameter calculating means for calculating a control parameter of said internal combustion engine, on the basis of the operating condition sensed by said sensors, an igniter for igniting said internal combustion engine in accordance with the control parameter, an ion current detector for detecting an ion current produced by ignition of said internal combustion engine, a first misfire determination means for determining a misfire of said internal combustion engine on the basis of a temporal change of the rotation information of said internal combustion engine contained in the operating condition sensed by said sensors, a second misfire determination means for determining a misfire of said internal combustion engine on the basis of the ion current, and misfire determination selecting means for selectively employing said first or second misfire determination means in accordance with the operating area, wherein when said operating area detecting means detects the operating area that is less than or equal to a predetermined rotation number, said misfire determination selecting means determines the misfire in accordance with a logical product between a detection result of said first misfire detecting means and a detection result of said second misfire detecting means.

2. The misfire detecting device for the internal combustion engine according to claim 1, wherein said misfire determination selecting means comprises:

ion current state determining means for determining an adequate state of an ion current, and wherein when it is determined that the ion current is adequate, the misfire is determined in accordance with the logical product between a detection result of said first misfire detecting means and a detection result of said second misfire detecting means in an area of a predetermined rotation number or less, and when it is determined that the ion current is inadequate, said first misfire detecting means is employed in said area of the predetermined rotation number or less.

3. A misfire detecting device for an internal combustion engine comprising:

sensors for sensing an operating condition of said internal combustion engine, operating area detector for detecting a divided operating area, on the basis of the rotation information of said internal combustion engine, control parameter calculation for calculating a control parameter of said internal combustion engine, on the basis of the operating condition sensed by said sensors, an igniter for igniting said internal combustion engine in accordance with the control parameter, an ion current detector for detecting an ion current produced by ignition of said internal combustion engine, a first misfire determination device for determining a misfire of said internal combustion engine on the basis of a temporal change of the rotation information of said internal combustion engine contained in the operating condition sensed by said sensors, a second misfire determination device for determining a misfire of said internal combustion engine on the basis of the ion current, and a misfire determination selector for selectively employing said first or second misfire determination means in accordance with the operating area, wherein when said operating area detector detects the operating area that is less than or equal to a predetermined rotation number, said misfire determination selector determines the misfire in accordance with a logical product between a detection result of said first misfire detecting device and a detection result of said second misfire detecting device.

4. The misfire detecting device for the internal combustion engine according to claim 3, wherein said misfire determination selector comprises:

ion current state determining device for determining an adequate state of an ion current, and wherein when it is determined that the ion current is adequate, the misfire is determined in accordance with the logical product between a detection result of said first misfire detector and a detection result of said second misfire detector in an area of a predetermined rotation number or less, and when it is determined that the ion current is inadequate, said first misfire detector is employed in said area of the predetermined rotation number or less.

* * * * *